United States Patent
Maetani

(10) Patent No.: US 9,985,447 B2
(45) Date of Patent: May 29, 2018

(54) BATTERY DEVICE

(71) Applicant: SII Semiconductor Corporation, Chiba-shi, Chiba (JP)

(72) Inventor: Fumihiko Maetani, Chiba (JP)

(73) Assignee: ABLIC INC., Chiba (JP)

( * ) Notice: Subject to any disclaimer, the term of this patent is extended or adjusted under 35 U.S.C. 154(b) by 79 days.

(21) Appl. No.: 15/090,910

(22) Filed: Apr. 5, 2016

(65) Prior Publication Data
US 2016/0315494 A1    Oct. 27, 2016

(30) Foreign Application Priority Data

Apr. 21, 2015    (JP) .................................. 2015-087050

(51) Int. Cl.
*H02J 7/00*    (2006.01)

(52) U.S. Cl.
CPC ............ *H02J 7/0029* (2013.01); *H02J 7/007* (2013.01)

(58) Field of Classification Search
CPC ............ H02J 7/0031; H02J 2007/0037; H02J 2007/0039; H02J 2007/004; H02J 7/0021; H02J 7/0026; H02J 7/0029; H02J 7/0034; H02J 7/007; H02J 7/008; H02J 7/0086
See application file for complete search history.

(56) References Cited

U.S. PATENT DOCUMENTS

| | | | |
|---|---|---|---|
| 2001/0052759 A1 | 12/2001 | Sakurai et al. | |
| 2013/0063090 A1* | 3/2013 | Takeshita | H02J 7/0031 320/126 |
| 2016/0094065 A1* | 3/2016 | Motoichi | H02J 7/0021 320/126 |

* cited by examiner

*Primary Examiner* — Nha Nguyen
(74) *Attorney, Agent, or Firm* — Brinks Gilson & Lione

(57) ABSTRACT

Provided is a battery device high in safety and ease of use, which has no difficulty in returning to a normal state after discharge overcurrent is detected. The battery device includes a first charge/discharge control device including a first charge/discharge control transistor, and a first charge/discharge control circuit configured to detect the voltage of a secondary battery to control charging and discharging; a second charge/discharge control device including a second charge/discharge control transistor connected to an external terminal via the first charge/discharge control transistor, and a second charge/discharge control circuit configured to detect the voltage of the secondary battery to control charging and discharging; and a switch circuit arranged between an overcurrent detection terminal of the second charge/discharge control circuit and the external terminal. The switch circuit is turned on with a discharge stopping signal of the second charge/discharge control circuit.

1 Claim, 3 Drawing Sheets

BATTERY DEVICE

RELATED APPLICATIONS

This application claims priority under 35 U.S.C. § 119 to Japanese Patent Application No. 2015-087050 filed on Apr. 21, 2015, the entire content of which is hereby incorporated by reference.

BACKGROUND OF THE INVENTION

1. Field of the Invention

The present invention relates to a battery device including a charge/discharge control device configured to control the charging and discharging of a secondary battery.

2. Description of the Related Art

A battery device of the related art is illustrated in a circuit diagram of FIG. 3.

The battery device of the related art includes a secondary battery 11, a charge/discharge control device 23, an external positive terminal 24, and an external negative terminal 25. The charge/discharge control device 23 includes an Nch discharge control field effect transistor 16, an Nch charge control field effect transistor 17, a charge/discharge control circuit 14, resistors 12 and 15, and a capacitance 13. The charge/discharge control circuit 14 includes a positive power supply terminal 18, a negative power supply terminal 19, a discharge control signal output terminal 20, a charge control signal output terminal 21, and an overcurrent detection terminal 22.

The charge/discharge control circuit 14 monitors the voltage of the secondary battery 11 by keeping track of a voltage that is applied between the positive power supply terminal 18 and the negative power supply terminal 19. When the voltage of the secondary battery 11 exceeds an overcharge detection voltage, the charge/discharge control circuit 14 outputs a charge prohibiting signal from the charge control signal output terminal 21 to turn the Nch charge control field effect transistor 17 off, to thereby stop charging. This is called an overcharge detection function. When the battery voltage of the secondary battery 11 drops below an overdischarge detection voltage, the charge/discharge control circuit 14 outputs a discharge stopping signal from the discharge control signal output terminal 20 to turn the Nch discharge control field effect transistor 16 off, to thereby stop discharging. This is called an overdischarge detection function.

The charge/discharge control circuit 14 also monitors a current flowing in the battery device by keeping track of the voltage of the overcurrent detection terminal 22. When the voltage of the overcurrent detection terminal 22 exceeds a discharge overcurrent detection voltage, the charge/discharge control circuit 14 outputs a discharge stopping signal from the discharge control signal output terminal 20 to turn the Nch discharge control field effect transistor 16 off, to thereby stop discharging. This is called a discharge overcurrent detection function. When the voltage of the overcurrent detection terminal 22 drops below a charge overcurrent detection voltage, the charge/discharge control circuit 14 outputs a charge prohibiting signal from the charge control signal output terminal 21 to turn the Nch charge control field effect transistor 17 off, to thereby stop charging. This is called a charge overcurrent detection function.

Currently, battery devices that include two charge/discharge control devices are often used as more safe battery devices. Providing a battery device with two charge/discharge control devices means that, in the event of a failure of a first charge/discharge control circuit to operate, a second charge/discharge control device comes into operation, and hence safety of the battery device is enhanced.

However, battery devices of the related art that include two charge/discharge control devices have a problem in that, when the second charge/discharge control device detects discharge overcurrent and then the first charge/discharge control device detects overcharge, removing a load that is the cause of the discharge overcurrent does not always result in a successful return to a normal state because the detection of overcharge turns off the Nch charge control field effect transistor and the removal of the load accordingly does not change the voltage of the overcurrent detection terminal in the second charge/discharge control device.

SUMMARY OF THE INVENTION

In order to solve the problem of the related art, a battery device according one embodiment of to the present invention has the following configuration.

The battery device includes a first charge/discharge control device including a first charge/discharge control transistor, and a first charge/discharge control circuit configured to detect a voltage of a secondary battery to control charging and discharging; a second charge/discharge control device including a second charge/discharge control transistor connected to an external terminal via the first charge/discharge control transistor, and a second charge/discharge control circuit configured to detect the voltage of the secondary battery to control charging and discharging; and a switch circuit arranged between an overcurrent detection terminal of the second charge/discharge control circuit and the external terminal. The switch circuit is turned on with a discharge stopping signal of the second charge/discharge control circuit.

According to the present invention, the battery device high in safety and ease of use can be provided by making the voltage of the external negative terminal and the voltage of the overcurrent detection terminal of the second charge/discharge control circuit equal to each other when the second charge/discharge control circuit detects discharge overcurrent so that the voltage of the overcurrent detection terminal exceeds a threshold of a discharge overcurrent canceling circuit and is then dropped below the threshold of the discharge overcurrent canceling circuit by the removal of a load that is the cause of the discharge overcurrent, thus enabling the battery device to return to a normal state.

DETAILED DESCRIPTION OF THE PREFERRED EMBODIMENTS

An embodiment of the present invention is described below with reference to the drawings.

Figure 1:
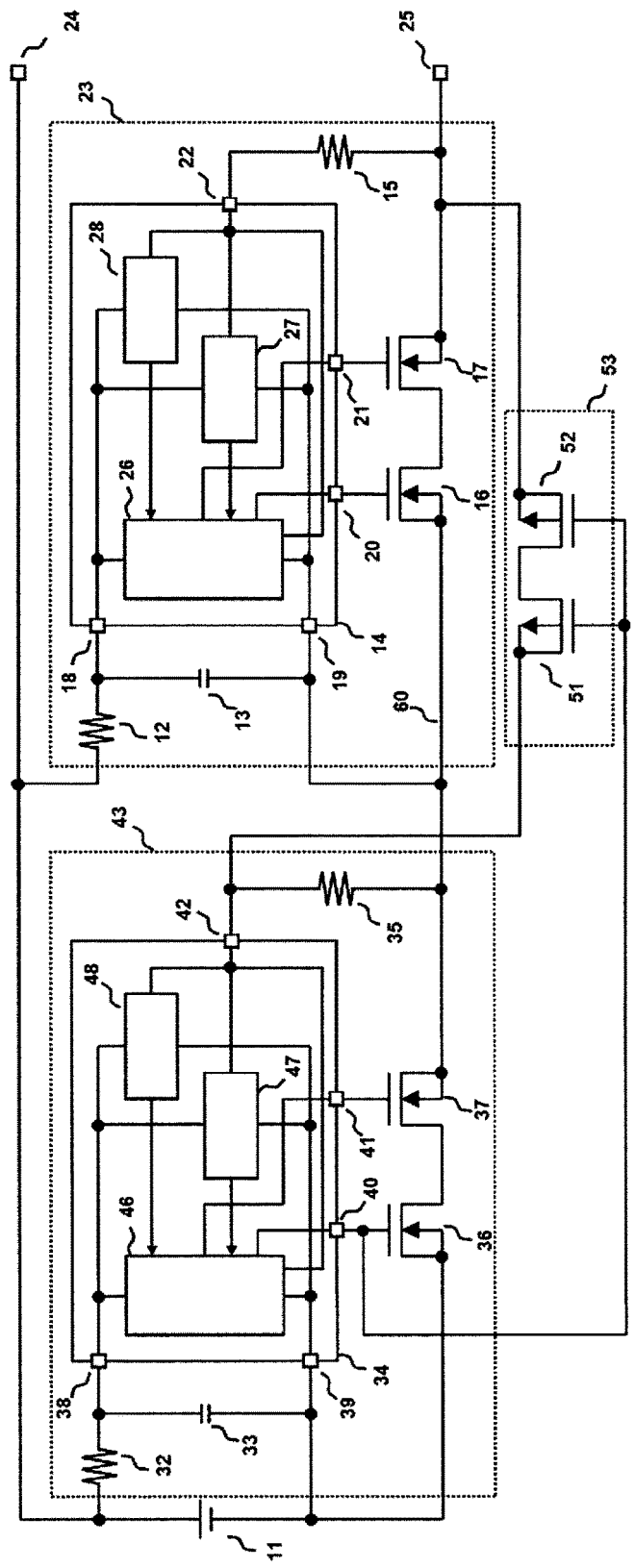
FIG. 1 is a circuit diagram of a battery device according to an embodiment of the present invention.

FIG. 1 is a circuit diagram of a battery device according to this embodiment.

The battery device according to this embodiment includes a secondary battery 11, a first charge/discharge control device 23, a second charge/discharge control device 43, an external positive terminal 24, an external negative terminal 25, and, a switch circuit 53.

The first charge/discharge control device 23 includes an Nch discharge control field effect transistor 16, an Nch charge control field effect transistor 17, a charge/discharge control circuit 14, resistors 12 and 15, and a capacitance 13. The charge/discharge control circuit 14 includes a positive power supply terminal 18, a negative power supply terminal 19, a discharge control signal output terminal 20, a charge control signal output terminal 21, and an overcurrent detection terminal 22. The switch circuit 53 includes Pch field effect transistors 51 and 52. The charge/discharge control circuit 14 further includes a control circuit 26, a discharge overcurrent detection circuit 27, and a discharge overcurrent canceling circuit 28.

The second charge/discharge control device 43 includes an Nch discharge control field effect transistor 36, an Nch charge control field effect transistor 37, a charge/discharge control circuit 34, resistors 32 and 35, and a capacitance 33. The charge/discharge control circuit 34 includes a positive power supply terminal 38, a negative power supply terminal 39, a discharge control signal output terminal 40, a charge control signal output terminal 41, and an overcurrent detection terminal 42. The charge/discharge control circuit 34 further includes a control circuit 46, a discharge overcurrent detection circuit 47, and a discharge overcurrent canceling circuit 48.

The positive pole of the secondary battery 11 is connected to the external positive terminal 24 and the resistors 12 and 32. The negative pole of the secondary battery 11 is connected to the capacitance 33 and the negative power supply terminal 39, and to a source and back gate of the Nch discharge control field effect transistor 36. The positive power supply terminal 38 is connected to a connection point at which the resistor 32 and the capacitor 33 are connected to each other. The Nch discharge control field effect transistor 36 has a gate connected to the discharge control signal output terminal 40 and a drain connected to a drain of the Nch charge control field effect transistor 37. A gate of the Nch charge control field effect transistor 37 is connected to the charge control signal output terminal 41. A source and back gate of the Nch charge control field effect transistor 37 are connected to the capacitance 13 and the negative power supply terminal 19, to a source and back gate of the Nch discharge control field effect transistor 16, and to one terminal of the resistor 35 (this terminal is referred to as node 60). The other terminal of the resistor 35 is connected to the overcurrent detection terminal 42 and to a source and back gate of the Pch field effect transistor 51. A gate of the Pch field effect transistor 51 is connected to the discharge control signal output terminal 40 and to a gate of the Pch field effect transistor 52. A drain of the Pch field effect transistor 51 is connected to a drain of the Pch field effect transistor 52. A source and back gate of the Pch field effect transistor 52 are connected to the external negative terminal 25 and one terminal of the resistor 15, and to a source and back gate of the Nch charge control field effect transistor 17. The other terminal of the resistor 15 is connected to the overcurrent detection terminal 22. The positive power supply terminal 18 is connected to a connection node at which the resistor 12 and the capacitance 13 are connected to each other. The Nch discharge control field effect transistor 16 has a gate connected to the discharge control signal output terminal 20 and a drain connected to a drain of the Nch charge control field effect transistor 17. A gate of the Nch charge control field effect transistor 17 is connected to the charge control signal output terminal 21.

The operation of the battery device of this embodiment is described next.

The Nch discharge control field effect transistors 16 and 36 and the Nch charge control field effect transistor 17 and 37 are controlled so as to turn on when the voltage of the secondary battery 11 is equal to or less than an overcharge detection voltage and equal to or more than an overdischarge detection voltage. When a discharge current flows into a load connected between the external positive terminal 24 and the external negative terminal 25 in this state, a voltage difference is caused between the negative power supply terminal 19 and the external negative terminal 25. The first charge/discharge control device 23 uses the overcurrent detection terminal 22 to monitor this voltage difference. When the monitored voltage difference exceeds a discharge overcurrent detection voltage that is set by the discharge overcurrent detection circuit 27, the first charge/discharge control device 23 outputs a discharge stopping signal from the discharge control signal output terminal 20 to turn the Nch discharge control field effect transistor 16 off and put discharge overcurrent protection into effect.

The control circuit 26 short-circuits the discharge overcurrent detection terminal 22 and the negative power supply terminal 19 in a discharge overcurrent state so that the removal of a load that is the cause of the discharge overcurrent lowers the voltage of the overcurrent detection terminal 22. The discharge overcurrent canceling circuit 28 sets a value higher than the discharge overcurrent detection voltage as a threshold. In the case where the voltage of the overcurrent detection terminal 22 does not exceed the threshold of the discharge overcurrent canceling circuit 28, the discharge overcurrent state is broken by making the voltage of the overcurrent detection terminal 22 lower than the discharge overcurrent detection voltage. When the voltage of the overcurrent detection terminal 22 exceeds the threshold of the discharge overcurrent canceling circuit 28, the discharge overcurrent canceling circuit 28 comes into operation to break the discharge overcurrent state with the use of a voltage set as the threshold of the discharge overcurrent canceling circuit 28. The control circuit 26 thus performs control that makes it easy for the battery device to return to a normal state upon removal of the load.

When the discharge overcurrent protection function comes into operation and turns the Nch discharge control field effect transistor 16 off, the load makes the voltages of the external negative terminal 25 and the overcurrent detection terminal 22 close to the voltage value of the external positive terminal 24. The voltage of the overcurrent detection terminal 22 at this point is above the threshold of the discharge overcurrent canceling circuit 28, and the discharge overcurrent state is accordingly broken with the use of a voltage set as the threshold of the discharge overcurrent canceling circuit 28 which is a high voltage when the load is removed. The ease of use of the battery device is improved in this manner.

A case where discharge overcurrent protection of the second charge/discharge control device 43 is put into effect is considered next. The second charge/discharge control device 43 uses the overcurrent detection terminal 42 to monitor a voltage difference caused between the negative power supply terminal 39 and the node 60. When the monitored voltage difference exceeds a discharge overcurrent detection voltage that is set by the discharge overcurrent detection circuit 47, the second charge/discharge control device 43 outputs a discharge stopping signal from the discharge control signal output terminal 40 to turn the Nch discharge control field effect transistor 36 off and put discharge overcurrent protection into effect.

When the second charge/discharge control circuit 34 outputs a discharge stopping signal, the switch circuit 53 turns on to set the overcurrent detection terminal 42 of the second charge/discharge control circuit 34 and the external negative terminal 25 to the same voltage. This ensures that the voltage of the overcurrent detection terminal 42 exceeds the threshold of the discharge overcurrent canceling circuit 48 when discharge overcurrent protection of the second charge/discharge control device 43 is put into effect, thereby enabling the battery device to break out of the discharge overcurrent state with the use of a voltage set high as the threshold of the discharge overcurrent canceling circuit 48, upon removal of a load that is the cause of the discharge overcurrent. A battery device that has no difficulty in returning to a normal state and that is high in ease of use is thus provided.

The source and back gate of the Pch field effect transistor 51 which are connected to the overcurrent detection terminal 42 of the second charge/discharge control circuit 34 may instead be connected to the node 60. The present invention is obviously applicable also to cases where only the discharge current of a battery is controlled.

In the manner described above, the battery device of this embodiment is capable of breaking out of a discharge overcurrent state upon removal of a load that is the cause of the discharge overcurrent and returning to a normal state by providing the switch circuit configured to set the external negative terminal and the overcurrent detection terminal of the second charge/discharge control circuit to the same voltage when the second charge/discharge control device detects discharge overcurrent. The battery device is accordingly high in safety and ease of use.

Figure 2:
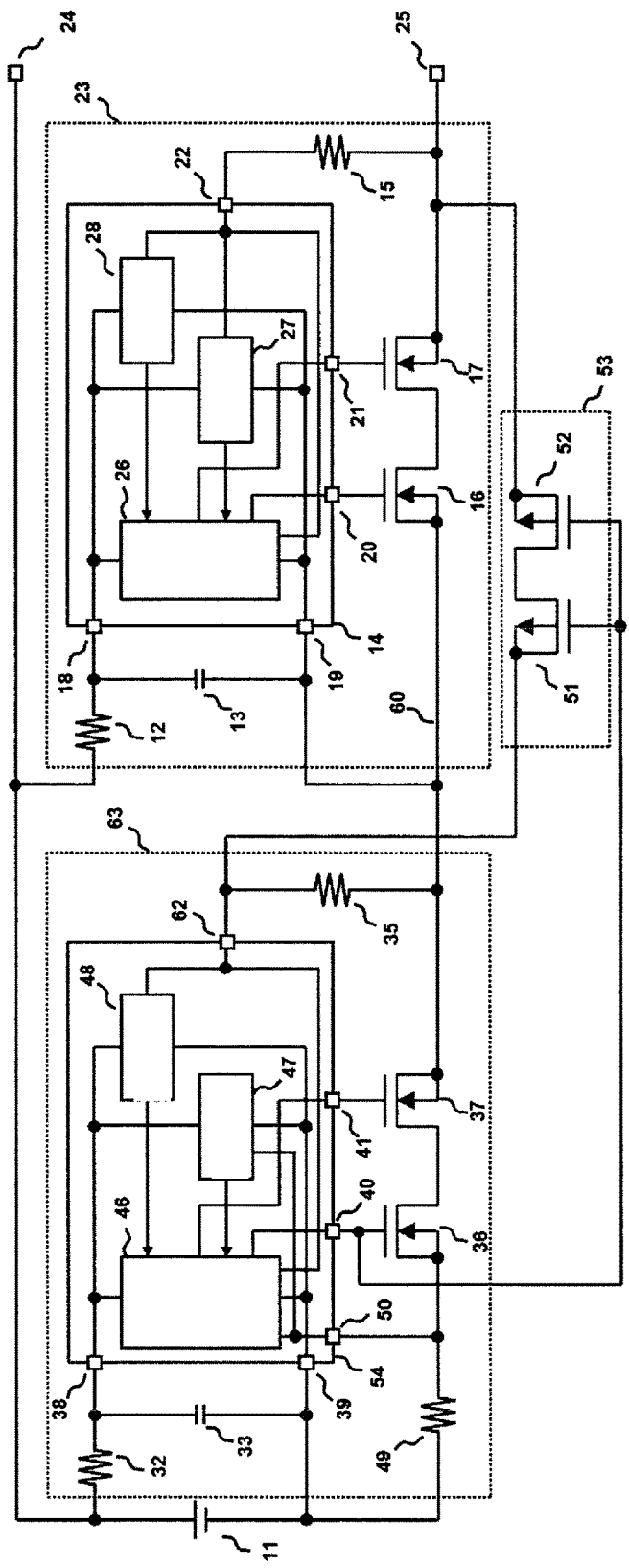
FIG. 2 is a circuit diagram for illustrating another example of the battery device according to this embodiment.
Figure 3:
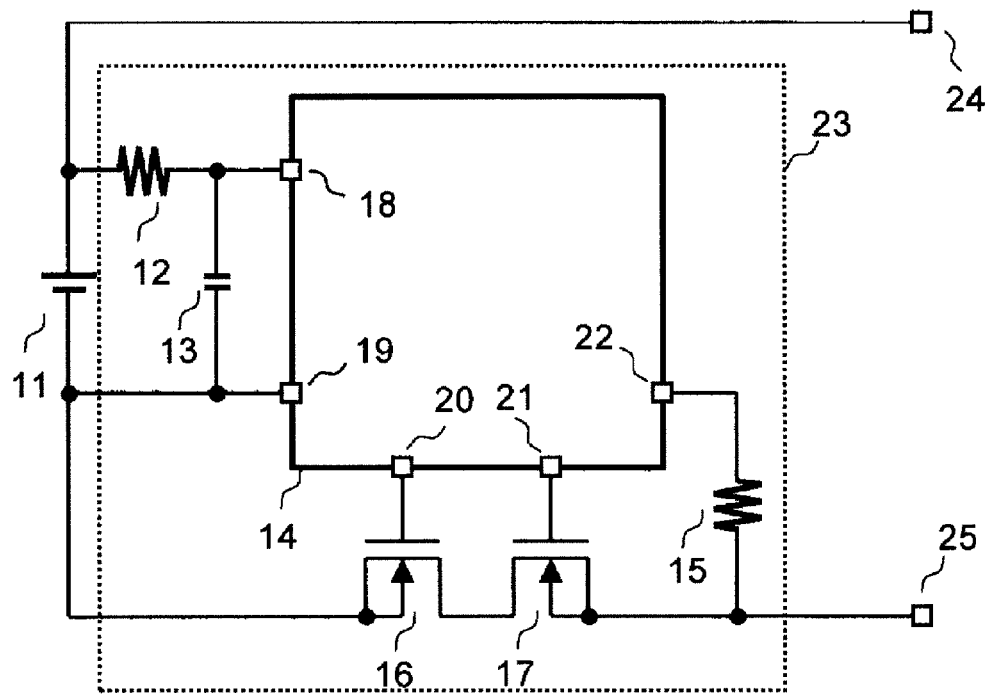
FIG. 3 is a circuit diagram of a battery device according to the related art.

FIG. 2 is a circuit diagram for illustrating another example of the battery device according to this embodiment. A difference from the battery device of FIG. 1 is that overcurrent in the second charge/discharge control device is detected by monitoring a voltage that is caused by the flowing of a current into a resistor. Other differences are that a resistor 49 and an overcurrent detection terminal 50 are added to a second charge/discharge control device 63 and the second charge/discharge control circuit 34, respectively, and that the overcurrent detection terminal 42 is replaced with an external voltage input terminal 62.

One terminal of the resistor 49 is connected to a connection point at which the negative terminal of the secondary battery 11 is connected to the capacitance 33 and the negative power supply terminal 39. The other terminal of the resistor 49 is connected to the source and back gate of the Nch discharge control field effect transistor 36, and to the overcurrent detection terminal 50. The overcurrent detection terminal 50 is connected to the control circuit 46 and the discharge overcurrent detection circuit 47. The external voltage input terminal 62 is connected to the discharge overcurrent canceling circuit 48 and the control circuit 46. The rest are connected the same way as in the battery device of FIG. 1.

The operation of the battery device of FIG. 2 is described next.

Discharge overcurrent protection operation that is executed by the first charge/discharge control device 23 is the same as in the battery device of FIG. 1.

A case where discharge overcurrent protection of the second charge/discharge control device 63 is put into effect is considered. The second charge/discharge control device 63 uses the overcurrent detection terminal 50 to monitor a voltage difference caused between two ends of the resistor 49. When the monitored voltage difference exceeds a discharge overcurrent detection voltage that is set by the discharge overcurrent detection circuit 47, the second charge/discharge control device 63 outputs a discharge stopping signal from the discharge control signal output terminal 40 to turn the Nch discharge control field effect transistor 36 off and put discharge overcurrent protection into effect. When a second charge/discharge control circuit 54 outputs a discharge stopping signal, the switch circuit 53 turns on to set the external voltage input terminal 62 of the second charge/discharge control circuit 54 and the external negative terminal 25 to the same voltage. This ensures that the voltage of the external voltage input terminal 62 exceeds the threshold of the discharge overcurrent canceling circuit 48 when discharge overcurrent protection of the second charge/discharge control device 63 is put into effect, thereby enabling the battery device to break out of the discharge overcurrent state with the use of a voltage set high as the threshold of the discharge overcurrent canceling circuit 48, upon removal of a load that is the cause of the discharge overcurrent. A battery device that has no difficulty in returning to a normal state and that is high in ease of use is thus provided.

The source and back gate of the Pch field effect transistor 51 which are connected to the external voltage input terminal 62 may instead be connected to the node 60.

While only the second charge/discharge control device detects overcurrent through a voltage difference caused by the flowing of a current into a resistor in this example, the first charge/discharge control device may also detect overcurrent through a voltage difference caused by the flowing of a current into a resistor.

The present invention is obviously applicable also to cases where only the discharge current of the battery is controlled.

In the manner described above, the battery device of according to a first embodiment of the present invention is capable of breaking out of a discharge overcurrent state upon removal of a load that is the cause of the discharge overcurrent and returning to a normal state by providing the switch circuit configured to set the external negative terminal and the external voltage input terminal of the second charge/discharge control circuit to the same voltage when the second charge/discharge control device detects discharge overcurrent. The battery device is accordingly high in safety and ease of use.

What is claimed is:
1. A battery device, comprising:
   a secondary battery;
   a first charge/discharge control device comprising a first charge control transistor, a first discharge control transistor, and a first charge/discharge control circuit configured to detect a voltage of the secondary battery to control charging and discharging;
   a second charge/discharge control device comprising a second charge control transistor and a second discharge control transistor connected to an external terminal via the first charge control transistor and the first discharge control transistor, and a second charge/discharge control circuit configured to detect the voltage of the secondary battery to control charging and discharging; and
   a switch circuit connected between an overcurrent detection terminal of the second charge/discharge control circuit and the external terminal, wherein the switch circuit has a control terminal connected to a discharge stopping signal output terminal of the second charge/discharge control circuit, and the switch circuit is turned on with a discharge stopping signal of the second charge/discharge control circuit.

* * * * *